United States Patent [19]

Ohashi

[11] Patent Number: 4,975,807
[45] Date of Patent: Dec. 4, 1990

[54] INDICATING APPARATUS

[75] Inventor: Masami Ohashi, Ageo, Japan

[73] Assignees: Nippon Seiki; Kabushiki Kaisha Asahi Keiki Seisakusho, both of Japan

[21] Appl. No.: 211,914

[22] Filed: Jun. 27, 1988

[30] Foreign Application Priority Data

Jun. 29, 1987 [JP] Japan .............................. 62-99897[U]
Jun. 29, 1987 [JP] Japan .............................. 62-99898[U]
Jun. 29, 1987 [JP] Japan .............................. 62-99899[U]

[51] Int. Cl.⁵ ......................................... G01D 11/28
[52] U.S. Cl. ........................................ 362/23; 362/26; 362/28; 362/326
[58] Field of Search ....................... 362/23, 26, 28, 29, 362/31, 326, 332, 339

[56]           References Cited
       U.S. PATENT DOCUMENTS

| | | | |
|---|---|---|---|
| 2,664,848 | 1/1954 | Nauth | 362/23 |
| 3,017,609 | 1/1962 | Ritchie . | |
| 4,268,615 | 5/1981 | Yonezawa | 430/320 |
| 4,310,871 | 1/1982 | Adachi | 362/26 |
| 4,323,951 | 4/1982 | Pasco | 362/26 |
| 4,447,860 | 5/1984 | Stone et al. | 362/30 |
| 4,765,701 | 8/1988 | Cheslak | 362/26 |

FOREIGN PATENT DOCUMENTS 0094316 11/1983 France .................... 362/31
0173116  8/1986 Japan ..................... 362/23

OTHER PUBLICATIONS

European Search Report, The Hague, 08-12-89.

*Primary Examiner*—Ira S. Lazarus
*Assistant Examiner*—Sue Hagarman
*Attorney, Agent, or Firm*—Lowe, Price, Leblanc, Becker & Shur

[57]               ABSTRACT

The present invention relates to an indicating apparatus which has light-refractive sections comprising concave and convex sections that are formed of ultraviolet-cured resin having light transmission properties and are disposed on a back surface of an indicating plate and adjacent an illuminating light source, is easy to manufacture, and, furthermore, is capable of obtaining the same three-dimensional illumination effect as those processed into a form of lens.

11 Claims, 10 Drawing Sheets

INDICATING APPARATUS

BACKGROUND OF THE INVENTION

1. Field of the Invention

The present invention relates to an indicating apparatus which is used for indicating a state of various types of equipment and for alarm-indicating an abnormal operating state of various types of equipment by applying light through a synthetic resin base plate, and for illuminating an indicating plate produced of synthetic resin.

2. Description of the Prior Art

Indicating apparatus adapted to apply light from a light source to a light-transmitting synthetic resin base plate to cause the base plate to glitter, have been known in the prior art as have been disclosed in, for example, U.S. Pat. No. 3,017,609 and U.S. Pat. No. 4,447,860.

Using an indicating apparatus to be mounted on motor vehicles as an example, this type of conventional indicating apparatus will be explained. An instrument housing is mounted in an instrument panel on a vehicle. Within this housing, indicating apparatus are mounted to indicate to a driver the location of a trouble occurring in each part of the vehicle or the operating condition of various equipment. Generally, the instrument built in the above-described housing has, in a part of its dial plate, a cutout window section having the same number of cutouts as items of vehicle to be indicated. In each of these cutout windows is disposed a base plate produced of such a synthetic resin which has light-transmission properties, e.g. polycarbonate resin, acrylic resin or AS resin. Each of the cells is defined at the back of the above-described dial plate by a partition wall surrounding each synthetic resin base plate. At the bottom of each of these cells is installed a light source. When this light source is turned on to apply a transmitting light of illumination to the synthetic resin base plate (which is an indicating plate) the plate glitters, indicating the operating state of each part of vehicle and the location of any detected trouble. In this case, with its visibility taken into consideration, the aforementioned synthetic resin base plate for the indicating plate known in prior art as suggested for example in Laid-Open Japanese Utility Model No. Sho 52-150340 published by the Patent Office of Japan, is processed into a diamond-cut form on the back side, whereby the plate glitters by refraction, reflection, diffusion and concentration of light from the light source, insuring easy reading of the indicating plate from the front.

However, there is a problem in that, for the manufacture of the diamond-cut portion comprising the concave and convex section formed on the aforesaid indicating plate, an indicating plate molding die of complicated configuration is required, which, therefore, takes time, resulting in a high die cost.

Considering the above-described problem, I have proposed a solution wherein a first colored layer is formed by printing on one side of a transparent synthetic resin base plate, and on this first colored layer is further formed a second colored layer provided with a number of for example round punched holes. (Refer to Laid-Open Japanese Utility Model No. Sho 58-149774 published by the Patent Office of Japan.)

The indicating plate of this indicating apparatus is of such a design that when the light from the light source is applied to the base plate, the portion excluding the above-described punched holes is illuminated through the first and second colored layers that have been laminated, while the punched hole portion is illuminated through the first colored layer alone, and accordingly the transmission factor by the light applied from the light source is high in the punched hole portion and low in regions other than the punched hole portion. In consequence, when viewed from the front of the base plate, the punched hole portion glitters and the other portion is faintly illuminated, thus providing an effect of illumination as if the base plate itself were cut into a lens-like form.

However, for the indicating plate of the indicating apparatus that has been constituted as such, it will sometimes become difficult to obtain a deep illumination effect because the brightness and dimness of light depends only upon a difference in the amount of light passing through each colored layer provided only upon the base plate 1.

SUMMARY OF THE INVENTION

In view of the above-described problems, the present invention has for its object to provide an indicating apparatus which is easy to manufacture because of the formation, in the base plate, of a light-refractive section which comprises a plurality of concavities and convexities of an ultraviolet-cured resin having light transmission properties and is able to obtain the same effect of deep illumination as one cut into a lens-like form.

BRIEF DESCRIPTION OF THE DRAWINGS

FIG. 1 is a sectional view;

FIG. 2 is a partially cutaway exploded perspective view;

FIG. 3 is a perspective view of a major portion;

FIGS. 4 (A) and (B) are schematic presentations showing one example of a method for molding a light-refractive section;

FIGS. 5 (A) and (B) are schematic presentations showing one example of another method for molding the light-refractive section;

FIG. 11 is a sectional view of a major portion;

FIG. 12 is a partially cutaway exploded perspective view;

FIG. 13 is an exploded view in perspective of a major portion;

FIG. 14 is a sectional view of a major portion;

FIG. 15 is an exploded perspective view;

FIG. 16 is an exploded view in perspective of a major portion;

FIG. 17 is a partially cutaway exploded perspective view;

FIG. 18 is a sectional view of a major portion;

FIG. 19 is a partially cutaway exploded view in perspective of a major portion.

FIG. 23 is a partially cutaway exploded perspective view;

FIG. 24 is a sectional view of a major portion;

FIG. 25 is a partially cutaway exploded view in perspective of a major portion.

FIGS. 26 and 27 are partially cutaway view in perspective of a major portion showing examples of modifications of the tenth embodiment;

DETAILED DESCRIPTION OF THE PREFERRED EMBODIMENT

Figure 1:
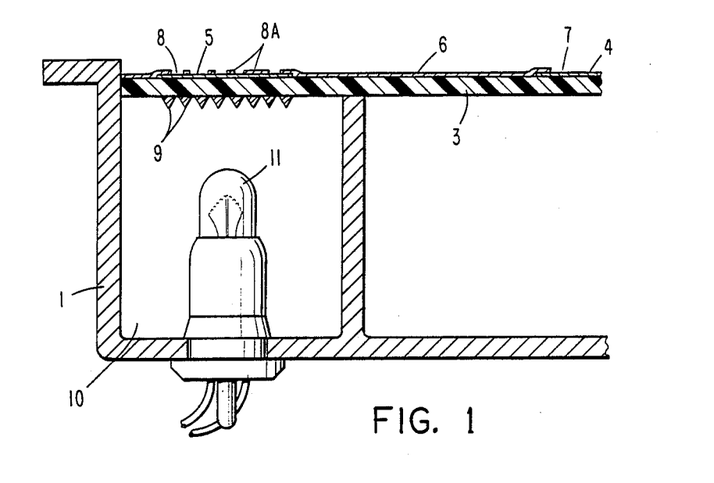
FIGS. 1 to 3 show a preferred embodiment of the present invention.
Figure 2:
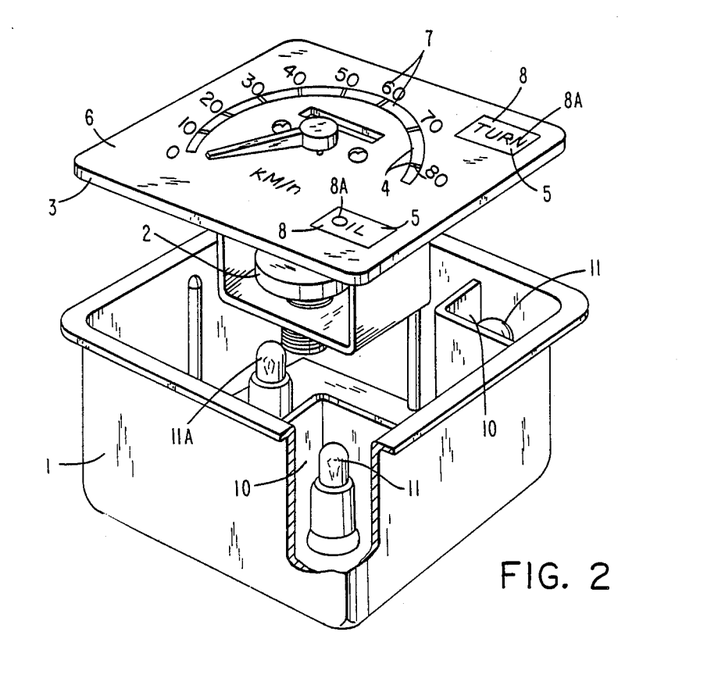
Figure 3:
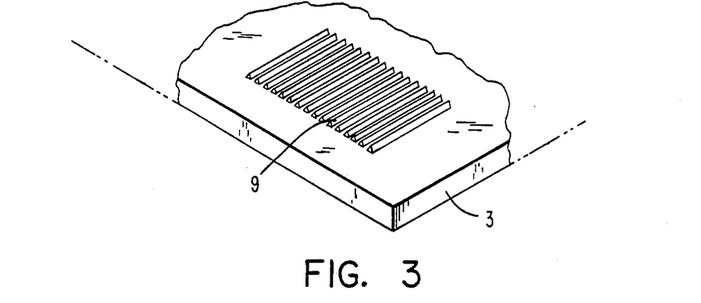

Preferred embodiments of the present invention will now be described by referring to the accompanying drawings. FIG. 1 is an exploded view in perspective of an indicating apparatus of a first preferred embodiment of the present invention. An indicating apparatus for vehicles, such as motorcycles, will be explained as an example.

In an instrument housing 1 for vehicle an instrument body 2 is fixedly housed. In the upper part of this instrument body 2, on the front opening side of the above-mentioned housing, is mounted a light-transmitting indicating plate 3 produced from a synthetic resin, such as polycarbonate resin, acrylic resin or AS resin.

According to this embodiment, the indicating plate 3 is of such construction that, on the surface of a colorless, transparent synthetic resin plate, an index layer 4 for indication of the aforementioned instrument body 2 is formed by printing in light-transmitting ink, for example white ink, and also an indicating layer 5 for recognizing the state of each part of vehicle is formed by printing in light-transmitting ink, for example red, green, yellow and blue ink, and furthermore, on the surface of the indicating plate 3 is formed a ground-color layer 6 by printing in opaque ink, for example black ink. In this case, the ground-color layer 6 is formed by printing over the entire surface of the aforementioned indicating plate 3 exclusive of the shape of the index section 7 having numerals and graduations for indication of the indicating instrument 2 and the shape of an indicating section 8 for recognizing the state of the above-described vehicle.

Therefore, in the above-described index section 7, the white color of the aforementioned index layer 4 becomes visible by punching the ground-color layer 6; and in the above-described indicating section 8, the above-described indicating layer 5 becomes visible by punching the ground-color layer 6.

In this embodiment, the indicating layer 5 is first formed by printing, and then the index layer 4 is printed. In this case, objective items of the indicating section 8 is clearly indicated by overprinting items to be indicated for each part of vehicle, for example characters 8A for warning, such as "OIL" and "TURN," by the index layer 4, over the indicating layer 5.

In this embodiment, the above-described indicating plate 3 is provided, on its back side, with light-refractive sections 9 each comprising a plurality of concavities and convexities arranged in parallel lines formed of UV ink comprising light-transmitting ultraviolet cured resins on the opposite side of the indicating sections 8.

Within the above-described housing 1, a lighting chamber 10 is dividedly formed on the back of the indicating plate 3, correspondingly to each of the above-described indicating sections 8, and a lighting apparatus 11, which is the light source, is disposed in this lighting chamber 10.

A reference numeral 11A is the lighting apparatus disposed in the instrument housing 1 for illuminating the indicating plate 3 of the indicating instrument.

The indicating state of the indicating apparatus of the above-mentioned constitution will be explained. When the lighting apparatus 11A is lit, the index section 7 provided on the indicating plate 3 is illuminated. Also when the lighting apparatus 11 designed to be illuminated in accordance with the condition of each part of vehicle is lit, the light rays from the lighting apparatus 11 are irregularly reflected by the light-refractive section 9 comprising a plurality of concavities and convexities formed of the aforementioned ultraviolet-cured resin, and the indicating section 8 provided on the indicating plate 3 appears in the form of parallel lines in the color of the indicating layer 5, thus indicating a warning. Since the indicating plate 3 glitters, deep, three-dimensional indication is obtained.

Figure 4A:
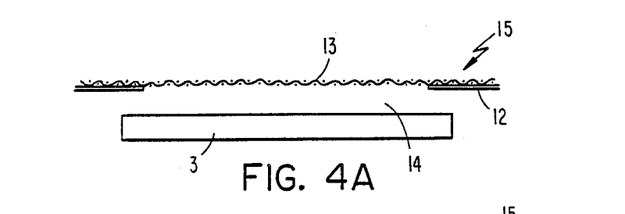
Figure 4B:
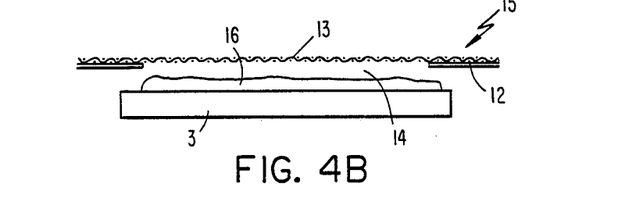

The light-refractive section 9 comprising concavities and convexities formed of the aforementioned ultraviolet-cured resin is formed as described below. As shown in FIG. 4 (A), a screen printing plate 15 with a printing image section 14 formed in a desired shape is prepared by partially closing meshes of screen gauge 13 with a resist 12. This screen printing plate 15 is placed above the above-described indicating plate 3 with an appropriate spacing provided therebetween. Then, a squeegee (not illustrated) having a blade of rubber or the like at the edge, with ultraviolet-cured resin applied thereon, is slid under an appropriate pressure, inclined to the surface of the plate, such that the printing image section 14 will come in linear contact with the indicating plate 3 only when the squeegee is moved, thus printing, at this time of contact, the ultraviolet-cured resin on the indicating plate 3 through the printing image section 14 and accordingly forming a convex section 16 of ultraviolet-cured resin in a desired shape as shown in FIG. 4 (B). Thereafter, when ultraviolet rays are applied to the convex section of this ultraviolet-cured resin, the ultraviolet-cured resin is changed from a liquid state to a solid state through photochemical reaction to the energy of ultraviolet rays, thus forming the light-refractive section 9 comprising a plurality of concavities and convexities, onto the indicating plate 3. In this case, the film thickness in the convex section 16 can easily be changed by changing the thickness of the gauze 13 of the printing plate 15, the thickness of the resist 12 section, or the viscosity of the ultraviolet-cured resin. Particularly when the formation of a thick film is required, overprinting is permitted.

Figure 5A:
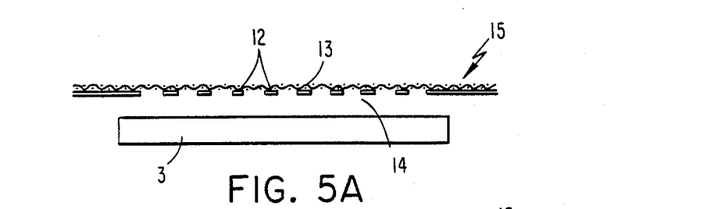
Figure 5B:
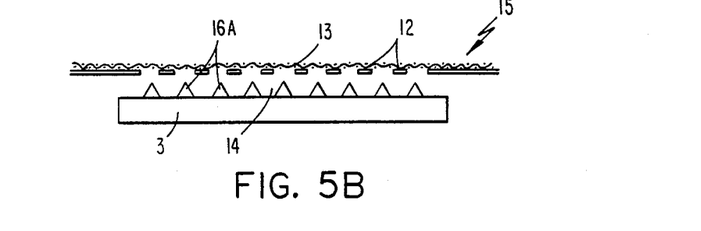

The printing plate 15 is formed of the printing image section adapted to alternately close the meshes of the gauze 13 with the resist 12. Screen-printing in a manner similar to that described above, as shown in FIG. 5 (A), forms a plurality of convex sections 16 of ultraviolet-cured resin at equal spaces as shown in FIG. 5 (B), and subsequently applying ultraviolet rays forms a plurality of light-refractive sections 9 on the indicating plate 3.

The light-refractive section comprising the plurality of concave and convex sections produced from ultraviolet-cured resin can freely be formed into various forms, such as a hemispherical form as shown in FIG. 6 (A), a conical form as shown in FIG. 6 (B), a tapered rhombic form as shown in FIG. 6 (C), a rectangular form as shown in FIG. 6 (D), a pyramidic form as shown in FIG. 6 (E), a diamond-cut form as shown in FIG. 6 (F), parallel lines as shown in FIG. 6 (G), and latticed lines as shown in FIG. 6 (H).

In the embodiment described above, the light-refractive section 9 comprising a plurality of concave and convex sections of varied forms is formed on a indicating plate 3 with the ultraviolet-cured resin, corresponding to the position of the indicating section 8; therefore, general screen printing techniques may be adopted to produce the light-refractive section. Then, when the lighting apparatus 11 is lit, its light is refracted, reflected, diffused and concentrated by the light-refractive section 9 comprising a plurality of concave and convex sections, thus presenting a deep, three-dimensional alarm indication, by which the illuminating and the unilluminating state of the lighting apparatus 11 can clearly be discriminated.

Figure 6A:
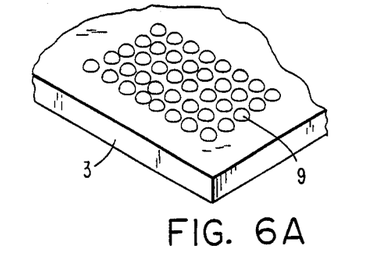
FIGS. 6(A)–(H) are various forms of concave and convex sections produced from ultraviolet-cured resin.
Figure 6B:
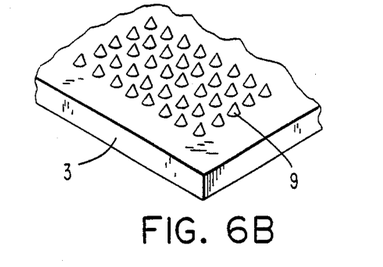
Figure 6C:
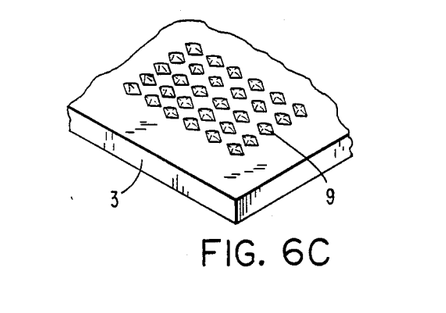
Figure 6D:
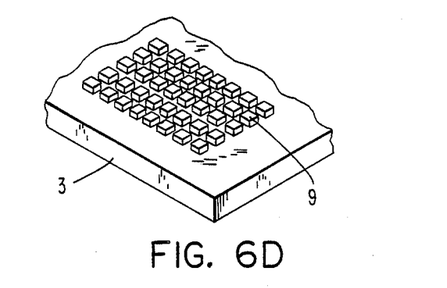
Figure 6E:
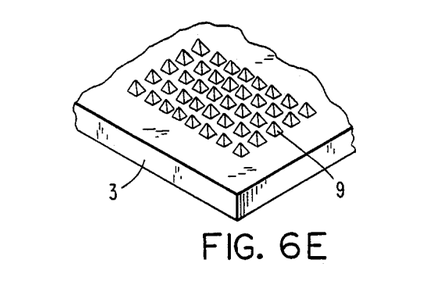
Figure 6F:
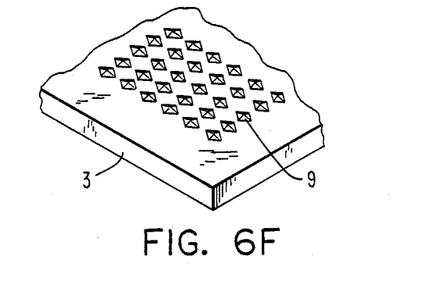
Figure 6G:
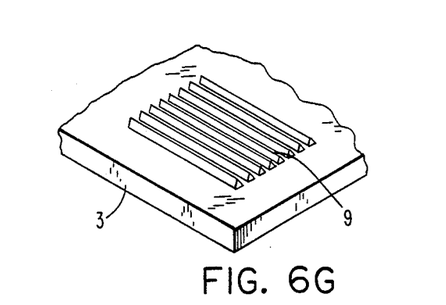
Figure 6H:
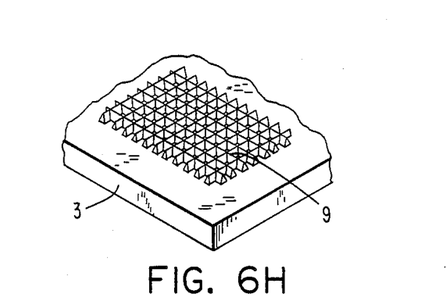
Figure 7:
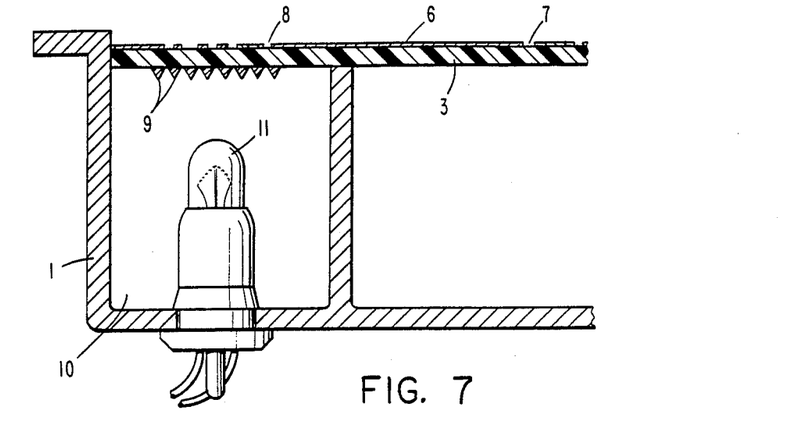
FIG. 7 is a sectional view showing a second embodiment of the present invention.
Figure 8:
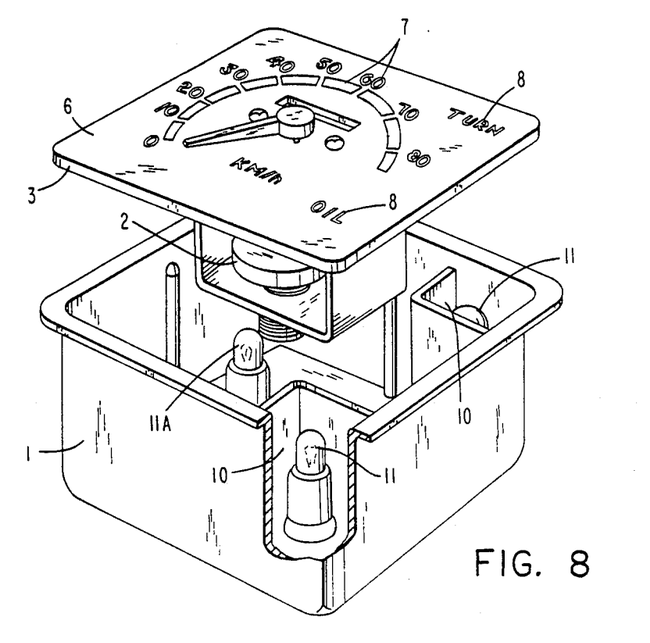
FIG. 8 is a partially cutaway view in perspective thereof.

FIGS. 7 and 8 show a second embodiment of the present invention, in which the same reference numerals are used for the same parts, the description of which, therefore, will be omitted. In this second embodiment, the indicating plate 3 colored in the color of alarm indication is formed. Over the entire surface of this indicating plate 3, the ground-color layer 6, excepting the shape section of the aforementioned characters 8A and the index section 7, is printed. Also, on the back side of the indicating plate 3, the light-refractive section 9 comprising a plurality of concave and convex sections formed of ultraviolet-cured resin is formed in a conical form shown in FIG. 6 (B), correspondingly to the position of the alarm-indicating section.

When the lighting apparatus 11 is illuminated, the light thereof gets colored to the color of the indicating plate 3 and at the same time is refracted, reflected, diffused and concentrated from the light-refractive section 9 comprising a plurality of concavities and convexities, thereby presenting deep, three-dimensional indication.

Figure 9:
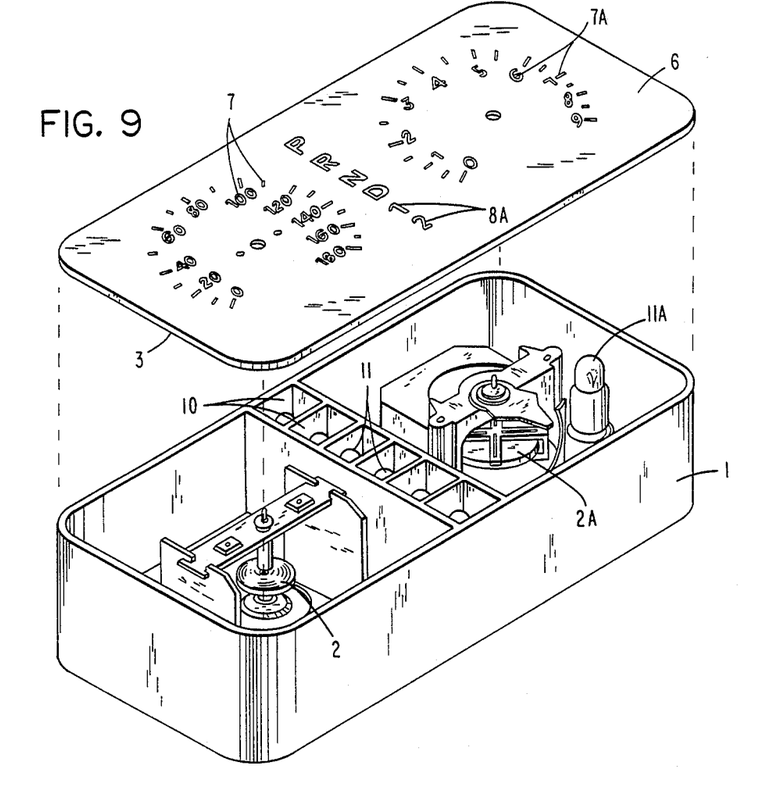
FIG. 9 is a partially cutaway perspective view showing a third embodiment of the present invention.
Figure 10:
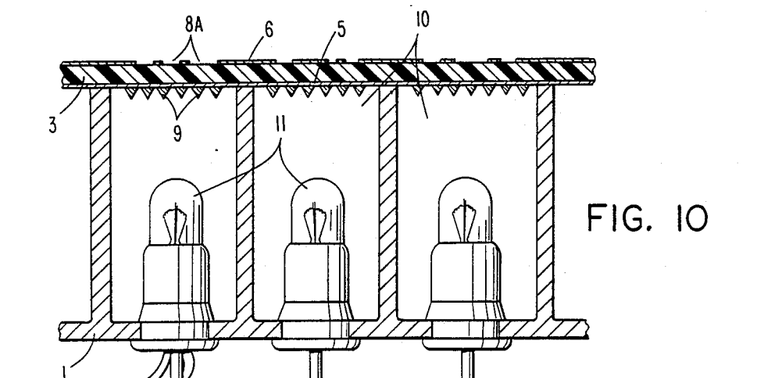
FIG. 10 is a sectional view of its major portion.

FIGS. 9 and 10 show a third embodiment of the present invention, in which the same reference numerals are used for the same parts of the embodiment described above, which, therefore, will be omitted in the following description. In the housing 1 are fixedly housed two instrument bodies 2 and 2A, right and left, at the top end of which one indicating plate 3 is installed at the front opening section of the above-described housing 1. At the central part of this indicating plate 3, a vehicle shift position indicating section is provided. Furthermore, on the surface of the indicating plate 3, the index sections 7 and 7A for indicating the instrument bodies 2 and 2A are formed. And furthermore, over its entire surface are printed characters and numerals 8A, such as "P . R . N . D . 1 . 2" provided correspondingly to the above-mentioned shift position indicating section, and the light-shielding ground-color layer 6 except the above-described index sections 7 and 7A. On the entire back side of the indicating plate 3, the indicating layer 5 is printed, and on the back side of this indicating layer 5 is formed, in the diamond-cut form, the light-refractive section 9 comprising a plurality of concave and convex sections produced of the ultraviolet-cured resin, correspondingly to the indicating section. Also, there are provided a plurality of lighting chambers 10 correspondingly to the characters and numerals 8A. In each of the lighting chambers 10 is provided the lighting apparatus 11. According to the above-described constitution, when the lighting apparatus 11 is illuminated, the light applied therefrom is refracted, reflected, diffused and concentrated by the light-refractive sections 9 comprising a plurality of concave and convex sections, presenting deep, three-dimensional indication in the color of the indicating layer 5.

Figure 11:
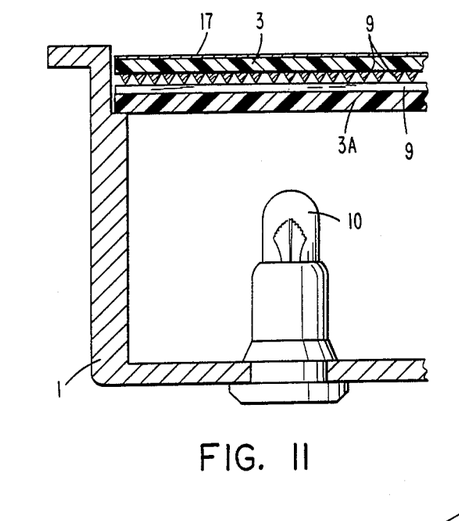
FIGS. 11 to 13 show a fourth embodiment of the present invention.
Figure 12:
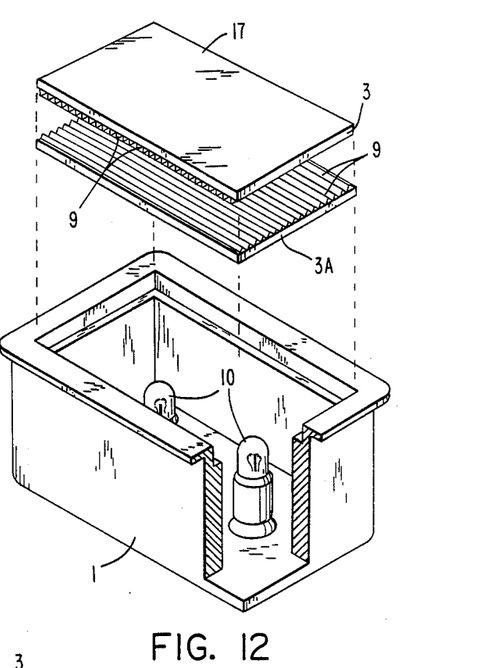
Figure 13:
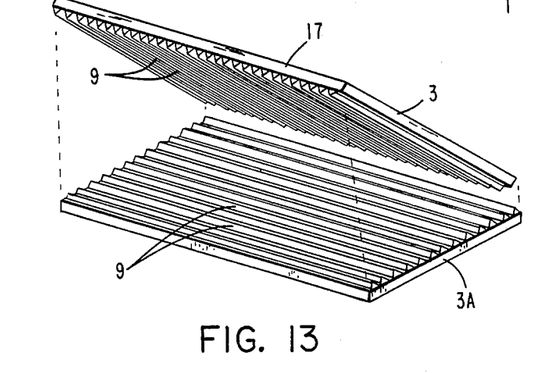

FIGS. 11 to 13 show a fourth embodiment of the present invention, which will be explained using the same reference numerals for the same parts as in the embodiment described above. In the housing 1 is housed the lighting apparatus 10. At the front opening of this housing 1, the light-transmitting indicating plate 3 is installed. In this case, the light-transmitting base plate 3A is installed behind the indicating plate 3, both the indicating plate 3 and the light-transmitting base plate 3A being jointed together, front and rear. The indicating plate 3 and the light-transmitting base plate 3A jointed together, front and rear, are produced from such synthetic resin as polycarbonate resin, acrylic resin or AS resin; in this embodiment, the above-described base plate 3A disposed at the rear is colorless, while the indicating plate 3 positioned at the front is colored with a coloring matter of for example the green color system; and on the surface of the indicating plate 3 positioned at the front side, a smoke layer 17 is printed in a light-transmitting ink of black color system. On either of the back side of the above-described indicating plate 3 and the surface of the base plate 3A is provided the light-refractive section 9 comprising a plurality of concave and convex sections in the form of parallel lines formed of UV ink which is one of light-transmitting ultraviolet-cured resins. The light-refractive sections 9 provided on the back side of the indicating plate 3 positioned at the front and the light-refractive section 9 provided on the surface of the base plate 3A positioned at the rear are so formed in their directions that both the light-refractive sections 9 meet at right angles to each other, making a lattice form when viewed from the indicating surface. When the lighting apparatus 11 is off, the smoke color of the above-described smoke layer 17 appears on the indicating surface, and when the lighting apparatus 11 is lit, its light of illumination is irregularly reflected by the light-refractive section 9 comprising a plurality of concave and convex sections produced of the aforesaid ultraviolet-cured resin, and furthermore is refracted, reflected, diffused and concentrated, thereby presenting deep, three-dimensional indication in a lattice form.

The light-refractive section 9 of the above-described light-transmitting base plate 3A also can be formed by the method shown in FIG. 4 or FIG. 5 similarly to the light-refractive section 9 of the indicating plate 3 and in various shapes shown in FIG. 6.

As described above in this embodiment, there can be gained the effect that similar effects as the first and third embodiments and various other desired illumination effects are obtainable by forming the light-refractive section 9 of ultraviolet-cured resin on the light-transmitting base plate 3A disposed on the back side of the indicating plate 3 and behind it.

Figures 14, 15, 16:
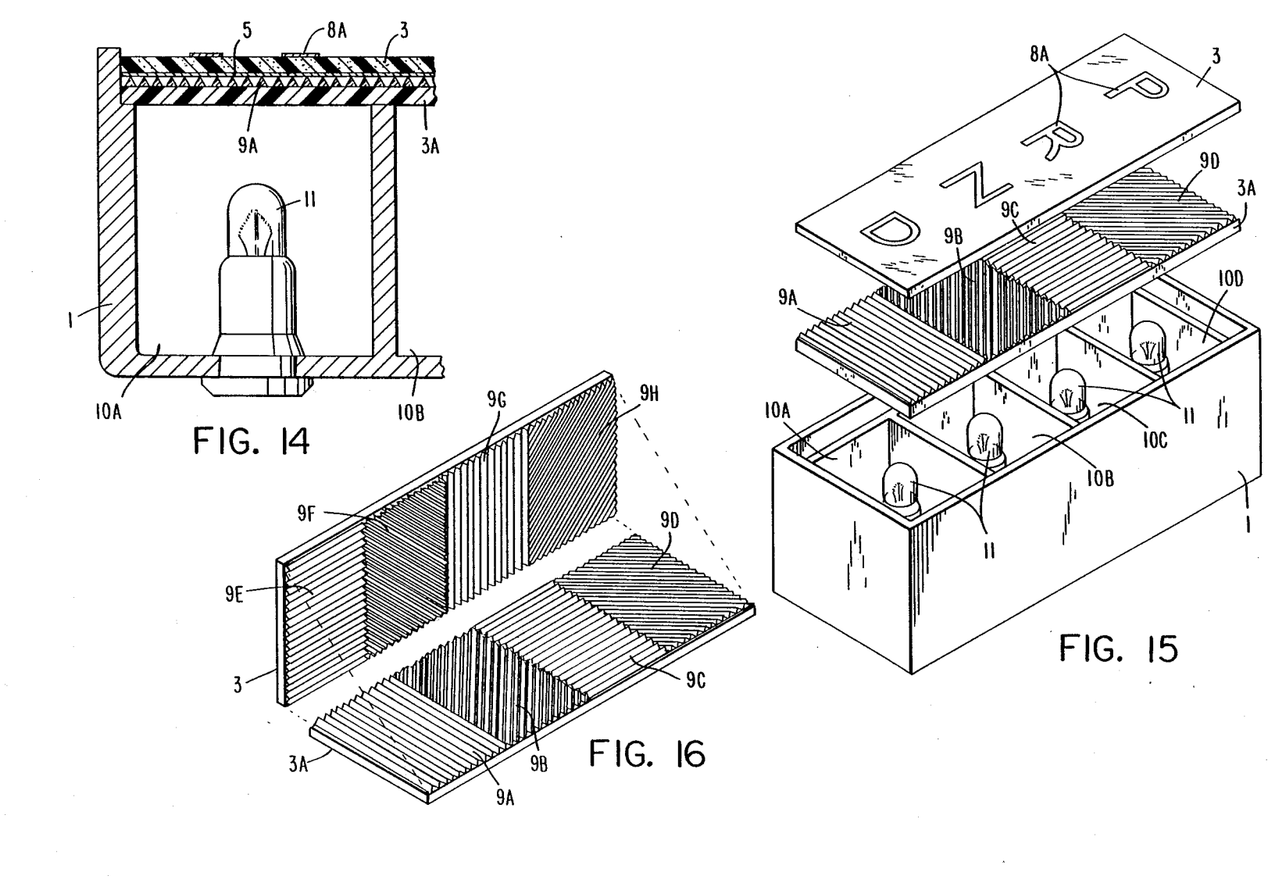
FIGS. 14 to 16 show a fifth embodiment of the present invention.

FIGS. 14 and 15 show a fifth embodiment of the present invention, wherein the same reference numerals are attached to the same constituent elements as have been used in the above-described embodiments, the description of which will be omitted.

The indicating plate 3 and the light-transmitting base plate 3A are unitedly disposed. The indicating plate 3 positioned at the front side is processed with smoke containing a light-transmitting coloring matter of black color system; on its surface are printed four characters 8A, "P, R, N, D", in for example white ink, and on its back side is formed by printing the indicating layer 5. In the meantime, on the surface of the light-transmitting base plate positioned at the rear are formed, in different directions, light-refractive sections 9A, 9B, 9C and 9D provided in the form of parallel lines comprising concave and convex sections formed of ultraviolet-cured resin in four regions divided correspondingly to the above-described characters 8A. The housing 1 has four lighting chambers 10A, 10B, 10C and 10D divided correspondingly to the above-mentioned four regions. In these lighting chambers 10A, 10B, 10C and 10D are provided lighting apparatus 11. Usually, only the characters 8A provided on the surface of the smoke-processed indicating plate are displayed. When one of the lighting apparatus 11 is illuminated, the characters 8A in the position corresponding to that light apparatus 11 are illuminated for indication in the color of the indicating layer 5. At this time, the light is refracted, reflected, diffused and concentrated by one of the light-refractive sections 9A, 9B, 9C and 9D which is produced from the ultraviolet-cured resin, thus illuminating the indicating plate 3 through in the from of parallel lines with depth and in three dimensions.

Therefore, since each of the characters 8A is indicated with different degrees of illumination by the light-refractive sections 9A, 9B, 9C and 9D comprising concave and convex sections which are provided in the form of parallel lines in different directions, the operating conditions of equipment can more easily be discriminated.

FIG. 16 shows the constitution indicated in the fifth embodiment described above and the formation of the light-refractive sections 9E, 9F, 9G and 9H also on the back side of the indicating plate 3 disposed at the front side. In this drawing, the light-refractive sections 9A, 9B, 9C and 9D formed on the surface of the base plate 3A and the light-refractive sections 9E, 9F, 9G and 9H formed on the back side of the indicating plate 3 are superimposed in intersecting directions or in the same direction.

Figure 17:
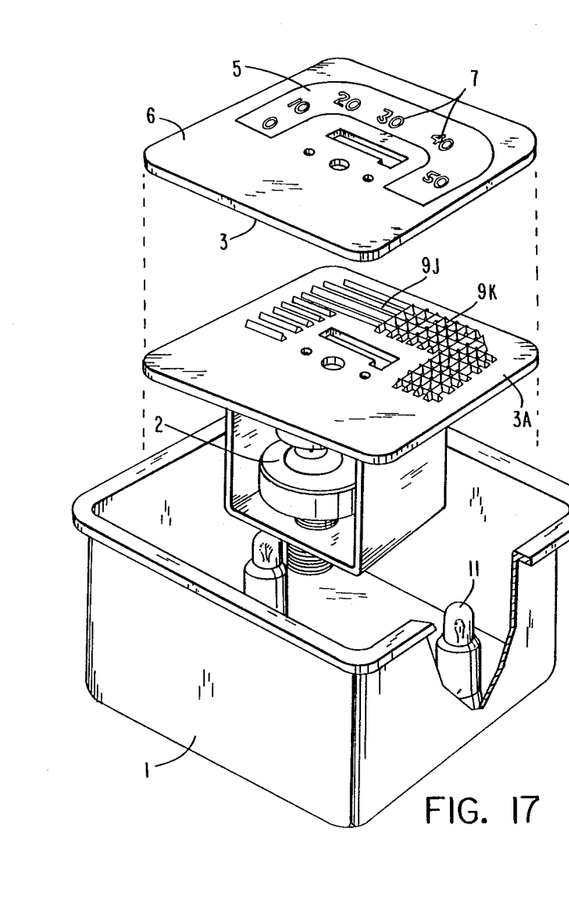
FIGS. 17 to 19 shows a sixth embodiment of the present invention.
Figures 18, 19, 19A:
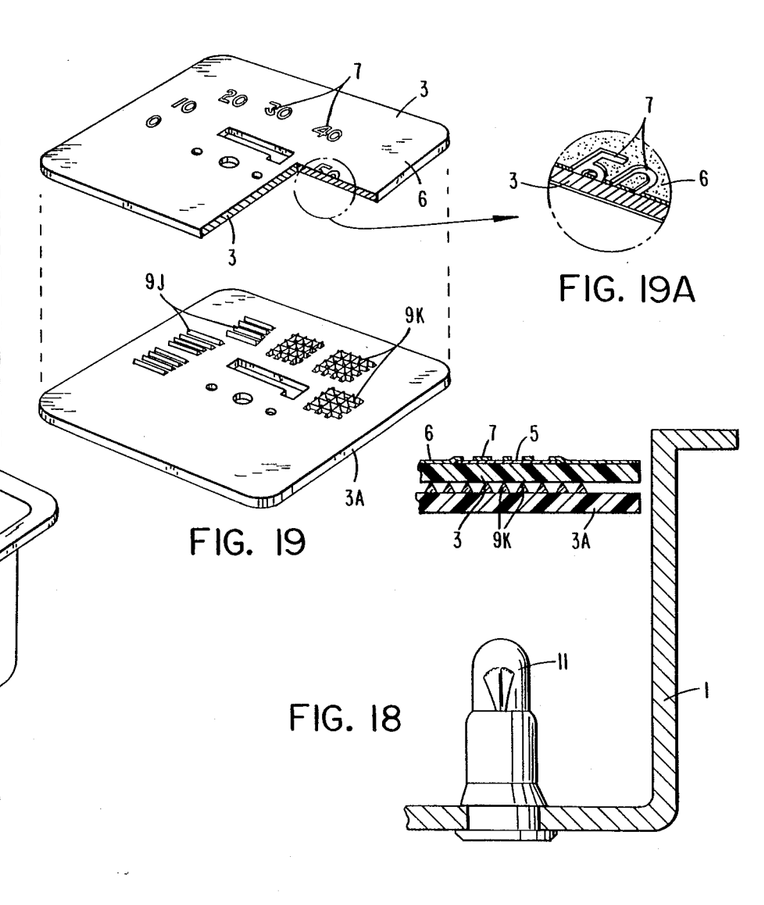
FIG. 19A is a magnified view of a portion of FIG. 19.

FIGS. 17 and 18 shows a sixth embodiment of the present invention, using the same reference numerals for the same parts used in the embodiments described above.

In describing this embodiment, an instrument apparatus mounted on a vehicle, for example a motorcycle, is used as an example.

In the housing 1 of instruments for vehicle, a instrument body 2 is fixedly housed. In the upper part of this instrument body 2, the indicating plate 3 and the light-transmitting base plate 3A are unitedly disposed at front and rear. On the surface of this indicating plate 3 is printed the indicating layer 5 in light-transmitting paint or ink and also printed the light-shielding ground-color layer 6 except the indicating section. Furthermore, on the surface of the above-mentioned indicating layer 5, the index section 7, such as numerals for indicating the speed of instruments, is printed in white ink. In the meantime, on the surface of the base plate 3A positioned at rear, a light-refractive section 9J produced of ultraviolet-cured resin is provided in the form of parallel lines correspondingly to the indication range of speed from 0 km/h to 30 km/h and also a light-refractive section 9K produced of ultraviolet-cured resin is provided in the lattice formation correspondingly to the speed indication range of from 30 km/h to 50 km/h. When the lighting apparatus 11 is lit, the light of illumination is refracted, reflected, diffused and concentrated by the light-refractive sections 9J and 9K, thereby indicating, with this light, the whole part of the indicating section comprising the indicating layer 5 with three-dimensional depth, by illumination the indicating section, with three-dimensional depth, in different color tones between the light-refractive section 9J formed in parallel lines correspondingly to the speed indication range of from 0 km/h to 30 km/h and the light-refractive section 9K formed in lattice lines provided correspondingly to the speed indication range of from 30 km/h to 50 km/h. Accordingly, in the case of a speedometer for example, the speed indication range of over 30 km/h can be clearly discriminated dividedly.

In the present embodiment, the light-refractive sections 9J and 9K may be formed separately, correspondingly to the above-described index section 7 such as numerals, by printing the light-shielding ground-color layer 6 on the entire surface of the indicating plate 3 except the index section 7 such as numerals as shown in FIG. 19.

Figure 20:
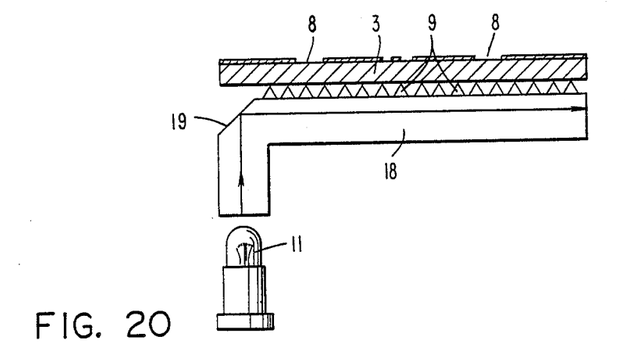
FIGS. 20, 21 and 22 are sectional views of major portions showing seventh, eighth and ninth embodiments of the present invention.
Figure 21:
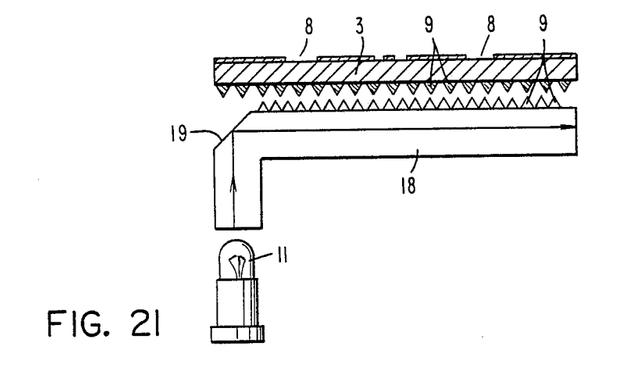

FIG. 20 shows a seventh embodiment of the present invention, wherein a light guide body 18 is provided on the back side of the light-transmitting indicating plate 3 produced of synthetic resin such as polycarbonate resin, acrylic resin or AS resin, and the light of illumination from this lighting apparatus 11 is fed into the above-described light guide body 18 and then reflectively guided in parallel with the above-described indicating plate 3 by a reflecting section 19 provided on the light guide body 18, indicating by illumination the indicating section 8 of the indicating plate 3. On the entire surface of the light guide body 18, the light-refractive section 9 comprising a plurality of concavities and convexities formed of a light-transmitting ultraviolet-cured resin, for example UV ink, is provided. FIG. 21 shows an eighth embodiment of the present invention, wherein the light-refractive section 9 comprising a plurality of concave and convex sections which are formed of ultraviolet-cured resin is provided on the entire back side of the above-described indicating plate 3 and on the entire surface of the light guide body 18.

Figure 22:
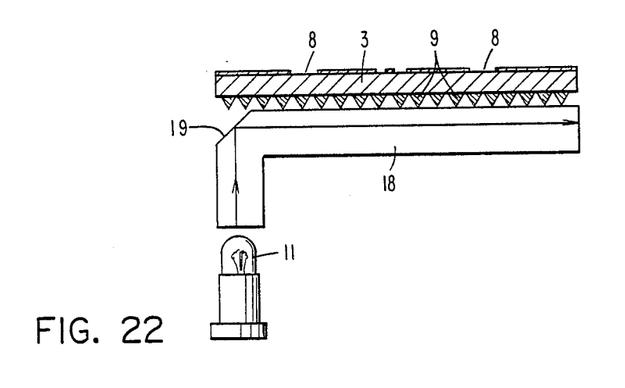

FIG. 22 shows a ninth embodiment of the present invention, wherein the light-refractive section 9 comprising a plurality of concave and convex sections which are formed of ultraviolet-cured resin is provided on the entire back side of the above-mentioned indicating plate 3. When the light of illumination from the lighting apparatus 11 enters the light guide body 18 and reflectedly guided in parallel with the indicating plate 3 by the reflecting section 19, the light of illumination is refracted, reflected, diffused and concentrated by a plurality of light-refractive sections 9 formed of the aforementioned ultraviolet-cured resin, thus indicating by illumination the above-described indicating section 8 with three-dimensional depth.

Figure 23:
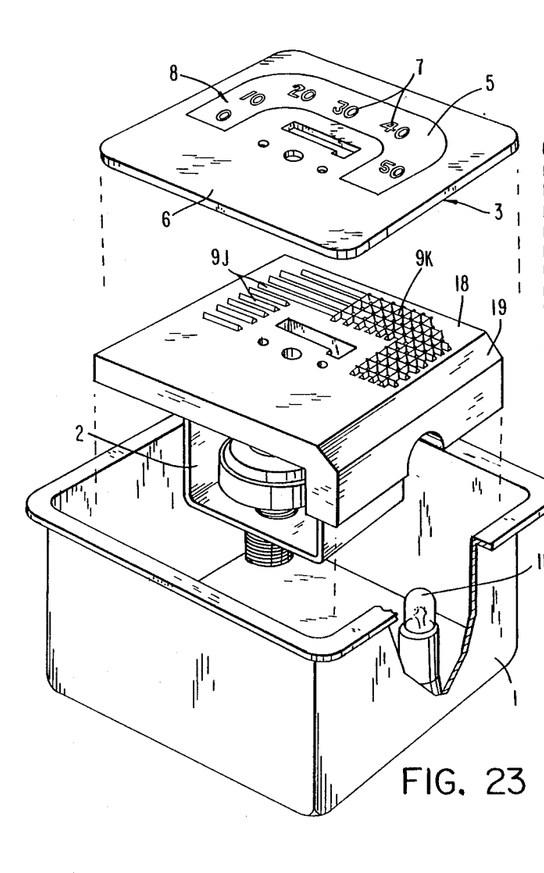
FIGS. 23 to 25 show a tenth embodiment of the present invention.
Figures 24, 25, 25A:
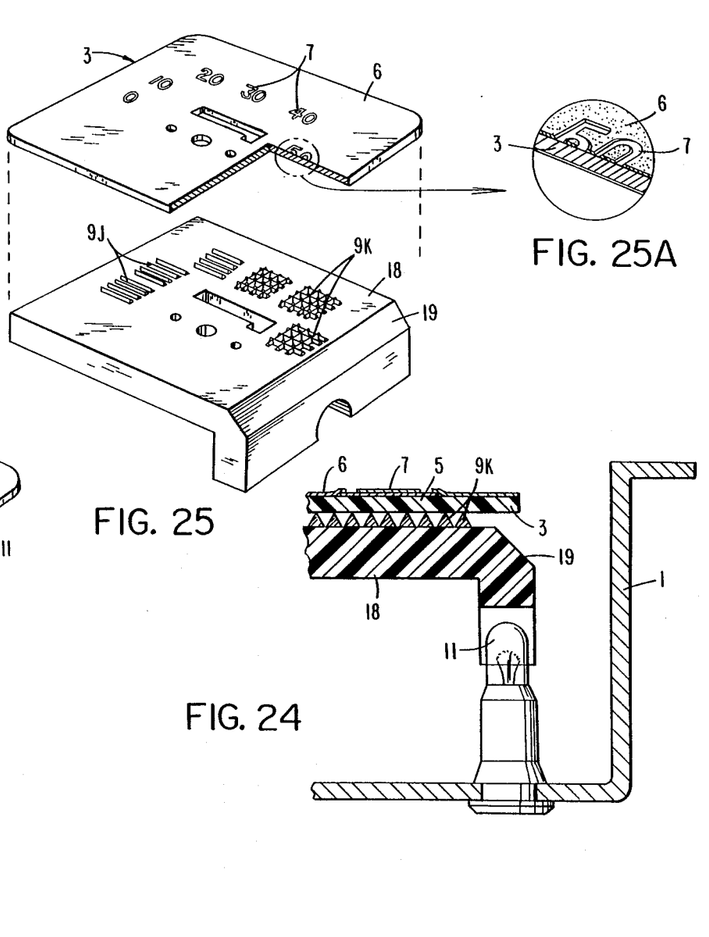
FIG. 25A is a magnified view of a portion of FIG. 25.

FIGS. 23 and 24 show a tenth embodiment of the present invention, wherein the same reference numerals are attached to the same parts used in the above-described embodiments, and an instrument apparatus mounted on a vehicle, for example a motorcycle, will be explained as an example. In the housing 1 of instruments for vehicle, the instrument body 2 and the lighting apparatus 11 are housed. At the front opening side of the housing 1 is disposed the indicating plate 3, behind which the light guide body 18 is disposed. On the surface of the above-described indicating plate 3, the indicating layer 5 of red, green, yellow and blue color systems is printed in light-transmitting ink in the location of the indicating section 8. On the surface of this indicating layer 5 is printed the index section 7 including numerals for indicating the speed of from 0 km/h to 50 km/h, and furthermore, is printed the light-shielding ground-color layer 6 except the indicating layer 6. In the meantime, on the surface of the light guide body 18, the light-refractive section 9J is formed in the form of parallel lines produced of ultraviolet-cured resin in the speed indication range of from 0 km/h to 30 km/h correspondingly to the location of the above-described indicating section 8, and also the light-refractive section 9K is formed in the form of lattice lines in the speed indication range of from 30 km/h to 50 km/h. When the lighting apparatus 11 is lit, the light of illumination enters the light guide body 18, which guides the light to the light-refractive sections 9J and 9K of ultraviolet-cured resin formed on the surface of this light guide body 18. At these light-refractive sections 9J and 9K, the light is refracted, reflected, diffused and concentrated, thereby indicating in the color of the above-described indicating layer 5 with a three-dimensional effect. Besides, since the speed range of from 0 km/h to 30 km/h and the speed range of from 30 km/h to 50 km/h are indicated by illumination in different condition, an alarm speed range in a speedometer for example can be distinguished.

Figure 26:
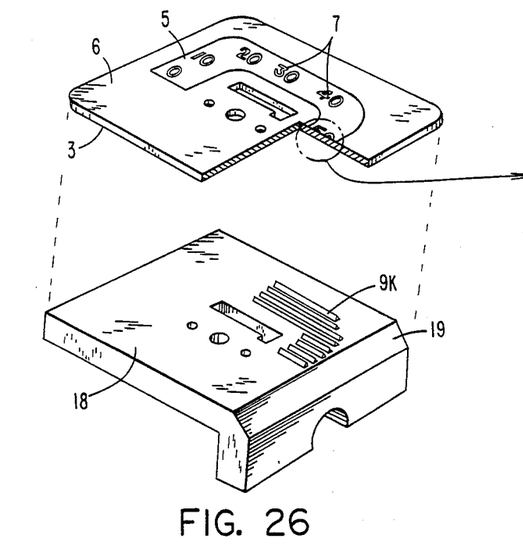
Figure 26A:
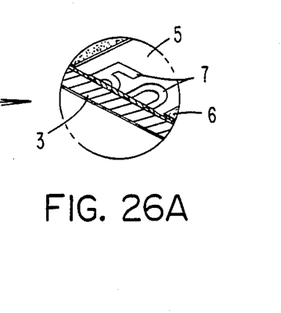
FIGS. 26A. 27A are magnified views of a portion of FIGS. 26, 27.
Figures 27, 27A:
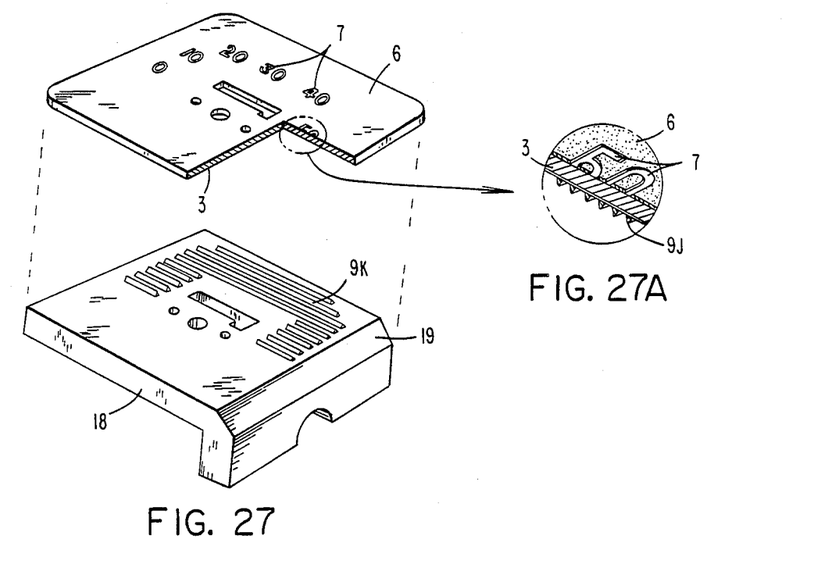

In the embodiment described above, a plurality of light refractive sections 9J and 9K of ultraviolet-cured resin provided on the surface of the light guide body 18, as shown in FIG. 25, may be dividedly provided within the range of the index section 7 such as numerals, and also the ground-color layer 6 may be printed in a part except the index section 7, without the indicating layer 5. Furthermore, as shown in FIG. 26, the light-refractive section 9K may be provided only within the range of speed from for example 30 km/h to 50 km/h; at the same time, the index section 7 may be printed below the indicating layer 5, and the ground-color layer 6, except the indicating layer 5 and the index section 7, may be printed. Furthermore, as shown in FIG. 27, the light-refractive section 9J on the back side of the indicating plate 3 and the refractive section 9K on the surface of the light guide body 18 may be disposed intersecting with each other so that the light-refractive sections 9J and 9K will be displayed in an intersecting state. That is, various types of combinations are realizable.

While preferred embodiments of the present invention are shown and described hereinabove, it will be understood that the present invention is not to be limited thereto, since various modifications and changes may be made within the scope of the present invention. For example, it is applicable to display panels of various types of equipment such as audio equipment, TV channel indicator panels, air-conditioner control panels, and so forth. Furthermore, colored indicating apparatus may be formed by adding pigments to the ultraviolet-cured resin.

Furthermore, beside the UV ink used as the ultraviolet-cured resin in the above-described embodiments, other resins which are solidified when applied with ultraviolet rays to gain the same effect as the UV ink are also usable.

What is claimed is:

1. An indicating apparatus comprising:
   a light-transmitting apparatus indicating plate; and
   a light source disposed behind said light-transmitting indicating plate that is to be lighted thereby, for illuminating at least a portion of said indicating plate when said light source is lit, said portion of said indicating plate being provided with a light-refractive section comprising concave and convex sections formed of light-transmitting ultraviolet-cured resin disposed on a back surface of the indicating plate and adjacent said light source.

2. An indicating apparatus according to claim 1, wherein:
   a plurality of light-refractive sections, having different shapes or disposed in different directions, are provided in relation to at least two indicating regions of said indicating plate.

3. An indicating apparatus according to claim 1, wherein:
   said light-refractive sections are formed in selected colors.

4. An indicating apparatus according to claim 1, wherein:
   said concave and convex sections comprise shapes selected from a group of shapes consisting of hemispherical, conical, tapered rhombic, rectangular, pyramidic, diamond cut, parallel lines and lattice lines.

5. An indicating apparatus wherein a light-transmitting base plate is unitedly disposed behind a light-transmitting indicating plate; and a light source capable of applying a transmissive light to said indicating plate is provided, and when said light source is lit, said indicating plate is illuminated for indication, characterized in that at least one of said indicating plate and light-transmitting base plate is provided with light-refractive section comprising concave and convex sections formed of light-transmitting ultraviolet-cured resin.

6. An indicating apparatus as claimed in claim 5, wherein said light-refractive section is provided on the back side of said indicating plate.

7. An indicating apparatus as claimed in claim 5, wherein said light-refractive section is provided on the front side of said light-transmitting base plate.

8. An indicating apparatus as claimed in claim 5, wherein said light-refractive sections are provided on the back side of said indicating plate and on the front side of said light-transmitting base plate.

9. An indicating apparatus as claimed in claim 8, wherein said light-refractive section provided on the back side of said indicating plate and said light-refractive section provided on the surface of said light-transmitting base plate are disposed in different shapes or in different directions.

10. An indicating apparatus as claimed in claim 5, wherein said light-transmitting base plate is formed of a light guide body for guiding the light from the light source.

11. An indicating apparatus as claimed in claim 5, wherein said light source is positioned behind said indicating plate and said light-transmitting base plate, so that the transmitted light will be applied from behind said indicating plate and said light-transmitting base plate for illumination of said indicating plate.

* * * * *